US006853978B2

(12) United States Patent
Forth et al.

(10) Patent No.: US 6,853,978 B2
(45) Date of Patent: Feb. 8, 2005

(54) SYSTEM AND METHOD FOR MANUFACTURING AND CONFIGURING INTELLIGENT ELECTRONIC DEVICES TO ORDER

(75) Inventors: J. Bradford Forth, Victoria (CA); Martin A. Hancock, Victoria (CA); Marcus Gasper, Victoria (CA); Peter M. Van Doorn, North Saanich (CA)

(73) Assignee: Power Measurement Ltd. (CA)

( * ) Notice: Subject to any disclaimer, the term of this patent is extended or adjusted under 35 U.S.C. 154(b) by 309 days.

(21) Appl. No.: 09/791,340

(22) Filed: Feb. 23, 2001

(65) Prior Publication Data

US 2002/0120521 A1 Aug. 29, 2002

(51) Int. Cl.[7] .............................................. G06F 17/60
(52) U.S. Cl. .............................. 705/26; 705/27; 705/14; 707/3; 707/10; 709/220; 713/100; 713/201; 717/177; 717/175; 710/19; 710/104; 370/468
(58) Field of Search .............................. 705/14, 26, 27; 710/19, 104; 707/3, 10; 713/100, 201; 709/220; 717/175, 177; 370/460

(56) References Cited

U.S. PATENT DOCUMENTS

| 5,570,292 A | | 10/1996 | Abraham et al. |
| 5,650,936 A | | 7/1997 | Loucks et al. |
| 5,675,748 A | * | 10/1997 | Ross ........................... 710/104 |
| 5,680,640 A | * | 10/1997 | Ofek et al. .................... 710/19 |
| 5,710,887 A | | 1/1998 | Chelliah et al. |
| 5,715,314 A | | 2/1998 | Payne et al. |
| 5,828,576 A | | 10/1998 | Loucks et al. |
| 5,909,492 A | | 6/1999 | Payne et al. |
| 5,960,204 A | * | 9/1999 | Yinger et al. ............... 717/176 |
| 5,963,743 A | | 10/1999 | Amberg et al. |
| 5,978,590 A | * | 11/1999 | Imai et al. ................... 717/177 |
| 5,991,543 A | | 11/1999 | Amberg et al. |
| 6,009,406 A | | 12/1999 | Nick ............................ 705/10 |
| 6,049,551 A | * | 4/2000 | Hinderks et al. ............ 370/468 |
| 6,092,189 A | | 7/2000 | Fisher et al. .................... 713/1 |

(List continued on next page.)

FOREIGN PATENT DOCUMENTS

| WO | WO 00/79452 A2 | 12/2000 | ........... G06F/17/60 |
| WO | WO 01/73651 | 10/2001 | |
| WO | WO 01/73651 A2 * | 10/2001 | ........... G06F/17/60 |

OTHER PUBLICATIONS

Taylor, Angela; " Emerging technologies you can put to use now"; Adweek; PP: 28–32 2001; ISSN:0199–2864, extracted from Dialog database on Sep. 14, 2004.*

Press release, "GlobalSpec.com enters Strategic partnership with © Autodesk", PR Newswire; New York; Apr. 26, 2000 extracted from Proquest database, http://proquest.umi.com on Internet on Jan. 30, 2003.*

Tittel et al. " XML For Dummies", published by IDG Books Worldwide, Foster City, CA 94404, Copyright © 1998, Chapter 1, What is XML and why should you care, pp. 11–26.*

Primary Examiner—Yogesh C. Garg
(74) Attorney, Agent, or Firm—Brinks Hofer Gilson & Lione

(57) ABSTRACT

A system and method of specifying built and configured to order intelligent electronic devices ("IED's") is disclosed. A customer interacts with an order processing interface to specify the type and model of IED they wish to purchase, any hardware options they wish installed and custom software to be loaded on the IED prior to shipment. The custom software includes object oriented frameworks which are functional applications custom developed by the customer. Once produced according to the customer's specifications, an IED is delivered to the customer which is capable of being used within the customer's specific application without further configuration by the customer.

86 Claims, 9 Drawing Sheets

U.S. PATENT DOCUMENTS

| | | | |
|---|---|---|---|
| 6,144,960 A | * 11/2000 | Okada et al. | 707/10 |
| 6,167,383 A | * 12/2000 | Henson | 705/26 |
| 6,182,275 B1 | * 1/2001 | Beelitz et al. | 717/175 |
| 6,192,470 B1 | 2/2001 | Kelly et al. | |
| 6,246,994 B1 | * 6/2001 | Wolven et al. | 705/14 |
| 6,247,128 B1 | * 6/2001 | Fisher et al. | 713/100 |
| 6,327,706 B1 | * 12/2001 | Amberg et al. | 717/174 |
| 6,714,937 B1 | 3/2004 | Eynon et al. | 707/102 |
| 2001/0001866 A1 | * 5/2001 | Kikinis | 709/220 |
| 2002/0007318 A1 | * 1/2002 | Alnwick | 705/26 |
| 2002/0026385 A1 | * 2/2002 | McCloskey et al. | 705/27 |
| 2002/0065741 A1 | * 5/2002 | Baum | 705/26 |
| 2002/0104022 A1 | * 8/2002 | Jorgenson | 713/201 |
| 2002/0152200 A1 | * 10/2002 | Krichilsky et al. | 707/3 |
| 2002/0156694 A1 | * 10/2002 | Christensen et al. | 705/26 |

* cited by examiner

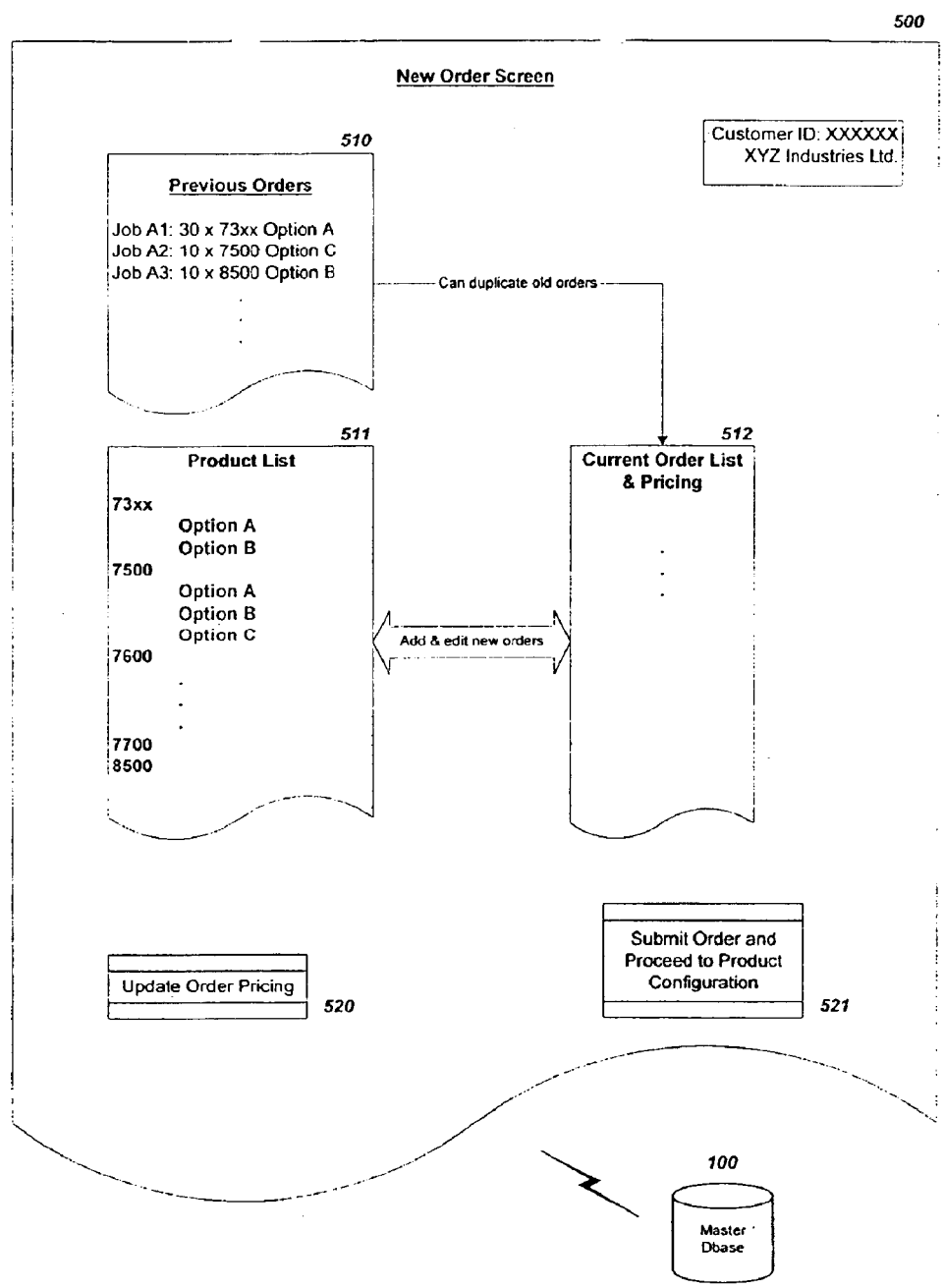

SYSTEM AND METHOD FOR MANUFACTURING AND CONFIGURING INTELLIGENT ELECTRONIC DEVICES TO ORDER

RELATED APPLICATIONS

The following co-pending and commonly assigned U.S. patent application has been filed on the same date as the present application. This application relates to and further describes other aspects of the embodiments disclosed in the present application and is herein incorporated by reference.

U.S. patent application Ser. No. 09/792,699, "SYSTEMS FOR IMPROVED MONITORING ACCURACY OF INTELLIGENT ELECTRONIC DEVICES", filed herewith.

U.S. patent application Ser. No. 09/792,699, "SYSTEMS FOR IN THE FIELD CONFIGURATION OF INTELLIGENT ELECTRONIC DEVICES", filed herewith.

BACKGROUND

With the advent of high technology needs and market deregulation, today's energy market has become very dynamic. High technology industries have increased their demands on the electrical power supplier, requiring more power, increased reliability and lower costs. A typical computer data center may use 100 to 300 watts of power per square foot compared to an average of 15 watts per square foot for a typical commercial building. Further, an electrical outage, whether it is a complete loss of power or simply a drop in the delivered voltage, can cost these companies millions of dollars in down time and lost business.

In addition, deregulation of the energy industry is allowing both industrial and individual consumers the unprecedented capability to choose their supplier which is fostering a competitive supply/demand driven market in what was once a traditionally monopolistic industry.

The requirements of increased demand and higher reliability are burdening an already overtaxed distribution network and forcing utilities to invest in infrastructure improvements at a time when the deregulated competitive market is forcing them to cut costs and lower prices. Further, consumers of electrical power are increasingly monitoring and managing their own consumption in an effort to reduce costs and utilize their energy resources in the most efficient manner.

In order to meet these needs, both suppliers and consumers are installing ever larger numbers of Intelligent Electronic Devices ("IED") throughout their facilities and energy distribution networks. IED's are intelligent power management devices designed to measure, manage and control the distribution and consumption of electrical power. One particular consumer or supplier may have hundreds or even thousands of IED's in place throughout their facilities (which may consist of multiple installations located in many disparate geographic locales) to manage their energy resources, with many more spare IED's in inventory as backups. Typically, these IED's are highly configured and tailored/customized to the specific applications and requirements of that consumer or supplier.

As the consumer or supplier updates or expands their operations, they must often order new or updated IED's either to replace outdated or broken devices or to meet the needs of their expansion. Typically, they will order generic devices from the manufacturer and configure them on-site prior to installation, for example, in an on-site "meter shop." For large numbers of IED's, this can be a very tedious, time consuming and resource intensive, i.e. expensive, process, requiring highly skilled personnel. Especially if the consumer or supplier runs an expansive operation and/or fails to keep track of the different IED configurations that they already have in place.

Accordingly, there is a need for a system and method for ordering IED's from a manufacturer that, when delivered to the electrical energy consumer or supplier, are fully configured to that customer's specific needs and ready for installation "out of the box."

SUMMARY

The present invention is defined by the following claims, and nothing in this section should be taken as a limitation on those claims. By way of introduction, the preferred embodiments described below relate to a system for processing an order from a customer by a provider for an intelligent electronic device ("IED"). The IED is characterized by at least one model and at least one type. The system includes a server computer and a first interface coupled with the server and operative to receive a first specification identifying a first IED to be ordered, the first specification identifying a particular one of the at least one model and type. The system also includes a second interface coupled with the server and operative to receive a second specification identifying optional hardware to be installed in the first IED. The system also includes a third interface coupled with the server and operative to receive a third specification identifying software provided by the customer to be installed in the first IED. The system further includes an order generator coupled with the server and operative to generate the order for the first IED from the first, second and third specifications such that the provider provides the first IED capable of being utilized by the customer without further configuration according to the first, second and third specifications.

The preferred embodiments further relate to a method of processing an order from a customer by a provider for an intelligent electronic device ("IED"), the IED being characterized by at least one model and at least one type. The method includes: receiving by an order processing system, a first specification identifying a first IED to be ordered, the first specification identifying a particular one of the at least one model and type; receiving by the order processing system, a second specification identifying optional hardware to be installed in the first IED; receiving by the order processing system, a third specification identifying software provided by the customer to be installed in the first IED; providing the first IED of the specified particular model and type; installing the specified optional hardware into the first IED; loading the software into the first IED; and supplying the first IED to the customer wherein the first IED is capable of being utilized by the customer without further configuration according to the first, second and third specifications.

Further aspects and advantages of the invention are discussed below in conjunction with the preferred embodiments.

BRIEF DESCRIPTION OF THE DRAWINGS

FIG. 11 illustrates a preferred embodiment of a new order interface.

DETAILED DESCRIPTION OF THE PRESENTLY PREFERRED EMBODIMENTS

Figure 1:
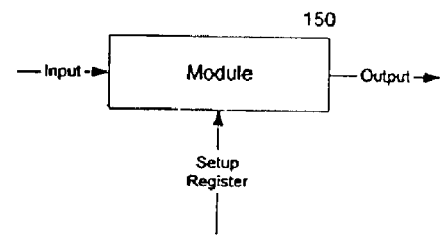
FIG. 1 depicts the structure of a framework module for use with the preferred embodiments

Intelligent electronic devices ("IED's") such as programmable logic controllers ("PLC's"), Remote Terminal Units ("RTU's"), electric/watt hour/energy meters, protection relays and fault recorders are widely available that make use of memory and microprocessors to provide increased versatility and additional functionality. Such functionality includes the ability to communicate with remote computing systems, either via a direct connection, e.g. modem or via a network. For more detailed information regarding IED's capable of network communication, please refer to U.S. patent application Ser. No. 09/723,564, entitled "INTRA-DEVICE COMMUNICATIONS ARCHITECTURE FOR MANAGING ELECTRICAL POWER DISTRIBUTION AND CONSUMPTION", filed Nov. 28, 2000. In particular, the monitoring of electrical power, especially the measuring and calculating of electrical parameters, provides valuable information for power utilities and their customers. Monitoring of electrical power is important to ensure that the electrical power is effectively and efficiently generated, distributed and utilized.

As used herein, Intelligent electronic devices ("IED's") include Programmable Logic Controllers ("PLC's"), Remote Terminal Units ("RTU's"), electric power (watt/hour) meters, protective relays, fault recorders and other devices which are coupled with power distribution networks to manage and control the distribution and consumption of electrical power. Such devices typically utilize memory and microprocessors executing software to implement the desired power management function. IED's include on-site devices coupled with particular loads or portions of an electrical distribution system and are used to monitor and manage power generation, distribution and consumption. IED's are also referred herein as power management devices ("PMD's"). While the preferred embodiments will be described in relation to revenue type electric watt/hour meters ("revenue meter" or "meter"), one will appreciate that they are applicable to all IED's as defined above.

A Remote Terminal Unit ("RTU") is a field device installed on an electrical power distribution system at the desired point of metering. It is equipped with input channels (for sensing or metering), output channels (for control, indication or alarms) and a communications port. Metered information is typically available through a communication protocol via a serial communication port. An exemplary RTU is the XP Series, manufactured by Quindar Productions Ltd. in Mississauga, Ontario, Canada.

A Programmable Logic Controller ("PLC") is a solid-state control system that has a user-programmable memory for storage of instructions to implement specific functions such as Input/output (I/O) control, logic, timing, counting, report generation, communication, arithmetic, and data file manipulation. A PLC consists of a central processor, input/output interface, and memory. A PLC is designed as an industrial control system. An exemplary PLC is the SLC 500 Series, manufactured by Allen-Bradley in Milwaukee, Wis.

A meter or electric watt hour meter or electric energy meter is a device that measures and records the consumption of electric power. In addition, meters may also measure and record power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power which they are metering. An exemplary revenue meter is the model 8500 meter, manufactured by Power Measurement Ltd, in Saanichton, B.C. Canada.

A protective relay is an electrical device that is designed to interpret input conditions in a prescribed manner, and after specified conditions are met, to cause contact operation or similar abrupt change in associated electric circuits. A relay may consist of several relay units, each responsive to a specified input, with the combination of units providing the desired overall performance characteristics of the relay. Inputs are usually electric but may be mechanical, thermal or other quantity, or a combination thereof. An exemplary relay is the type N and KC, manufactured by ABB in Raleigh, N.C.

A fault recorder is a device that records the waveform and digital inputs, such as breaker status which resulting from a fault in a line, such as a fault caused by a break in the line. An exemplary fault recorder is the IDM, manufactured by Hathaway Corp in Littleton, Colo.

Various different arrangements are presently available for monitoring, measuring, and controlling power parameters. Typically, an IED, such as an individual power measuring device, is placed on a given branch or line proximate to one or more loads which are coupled with the branch or line in order to measure/monitor power system parameters. Herein, the phrase "coupled with" is defined to mean directly connected to or indirectly connected with through one or more intermediate components. Such intermediate components may include both hardware and software based components. In addition to monitoring power parameters of a certain load(s), such power monitoring devices have a variety of other applications. For example, power monitoring devices can be used in supervisory control and data acquisition ("SCADA") systems such as the XA/21 Energy Management System manufactured by GE Harris Energy Control Systems located in Melbourne, Fla.

In a typical SCADA application, IED's/power measuring devices individually dial-in to a central SCADA computer system via a modem. However, such dial-in systems are limited by the number of inbound telephone lines to the SCADA computer and the availability of phone service access to the IED/power measuring devices. With a limited number of inbound telephone lines, the number of IED's that can simultaneously report their data is limited resulting in limited data throughput and delayed reporting. Further, while cellular based modems and cellular system access are widely available, providing a large number of power measuring devices with phone service is cumbersome and often cost prohibitive. The overall result is a system that is not easily scalable to handle a large number of IED's or the increased bandwidth and throughput requirements of advanced power management applications. However, the ability to use a computer network infrastructure, such as the Internet, allows for the use of power parameter and data transmission and reporting on a large scale. The Internet provides a connectionless point to point communications medium that is capable of supporting substantially simultaneous communications among a large number of devices. Alternatively, other type of networks could also be used such as intranets, extranets, or combinations thereof including virtual private networks. For example this existing Internet infrastructure can be used to simultaneously push out billing, load profile, or power quality data to a large number of IED's located throughout a power distribution system that can be used by those devices to analyze or make intelligent decisions based on power consumption at their locations. The bandwidth and throughput capabilities of the Internet supports the additional requirements of advanced power management applications. For example, billing data, or other certified revenue data, must be transferred through a secure process which prevents unauthorized access to the data and ensures receipt of the data by the appropriate device or entity. Utilizing the Internet, communications can be encrypted such as by using encrypted email. Further, encryption authentication parameters such as time/date stamp or the IED serial number, can be employed. Within the Internet, there are many other types of communications applications that may be employed to facilitate the above described inter-device communications such as hyper text transfer protocol ("HTTP"), email, Telnet, file transfer protocol ("FTP"), trivial file transfer protocol ("TFTP") or proprietary systems, both unsecured and secure/encrypted.

A typical customer or supplier of electrical energy may have hundred's of IED's installed throughout their operation. With the advent of scalable networking, as described above, customers/suppliers are installing even more IED's to better manage their electrical power needs. While these IED devices are typically installed as part of a system, each may be required to be individually customized, configured and programmed for a specific application by the end user. In certain applications multiple devices must be customized with the same information. Giving the consumer the ability to customize single or multiple devices prior to receipt in the supply chain or at the manufacturing point of these devices is extremely advantageous and cost effective.

An IED consists of two main parts, hardware and software. The hardware includes the components which actually connect to the power distribution system to measure parameters or control the flow of electrical power. The hardware may further include display devices, local or remote, communications devices such as modems or network interfaces, or combinations thereof. It will be appreciated that an IED may comprise many different hardware components now or later developed. The various hardware components may be divided into two categories, those that are standard, i.e. included by default, with a particular type and model of IED and those that are optional and may or may not be included. The determination of which hardware is standard and which is optional is dependent upon the manufacturer and how they design their IED's. An option on one model of IED may be standard on another model.

The other main part of an IED is the software. The software includes firmware software and applications software. Firmware is the low level operating code which enables the IED hardware to function. The firmware provides the basic operating capability. The firmware may also be referred to the operating system. The firmware may include standard as well as optional components where the optional components may be used to support optional hardware.

The applications software includes one or more software programs designed to utilize and manipulate the IED and data that it measures and controls. Applications software may include measurement and recording applications, measurement and control applications, communications applications, etc. The applications software further includes standard applications software and custom applications software. Standard applications software includes those applications developed by the manufacturer and provided with the IED. Standard applications software typically performs the basic function for which the IED is designed. Custom applications software include those applications developed by an end user of the IED and which are specifically tailored to the needs of that particular end user. Custom applications software may also be developed by third parties or by the IED manufacturer. Custom applications software usually performs more complicated and customer specific operations. In the preferred embodiments, the applications software is developed within a software development environment known as ION (described in more detail below). Each software application program is referred to as a "framework" (described in more detail below). Standard or custom frameworks, or combinations thereof, are loaded on the IED to control the functions of the IED and direct the performance of a particular power management application.

With the various available hardware options as well as the infinitely configurable nature of the software applications which can be installed, IED's are highly customizable devices and capable of performing a wide variety of power management functions. The preferred IED's utilize a unique object oriented software architecture where a framework defines the software architecture and operating structure of an IED, defining the way the power monitoring information is accessed, transferred and manipulated by the device. U.S. Pat. Nos. 5,650,936 and 5,828,576 disclose and further describe such object-oriented structures on power meters that can be readily configured to exactly match a user's unique requirements. While the preferred embodiments utilize this object oriented software architecture, it will be appreciated that the disclosed invention is applicable to non-object oriented based IED's which have the capability to load custom applications software for the purpose of defining the way the power monitoring information is accessed, transferred and manipulated by the device The integrated object network (ION™) is an object oriented software construct operating within the IED which defines the way information, specifically power monitoring information, is accessed, transferred and manipulated inside the device. The ION™ network is comprised of a variety of discrete units called modules. By combining or linking several modules together, one can create functions to suit a particular application. The resultant combination of these functions, referred to as a framework, is utilized by the IED to translate and manipulate data received from the IED inputs. An IED may have several frameworks operating at any given time, operating independently or in combination with other frameworks to perform various management, control, communications or other functions of the IED.

Figure 2:
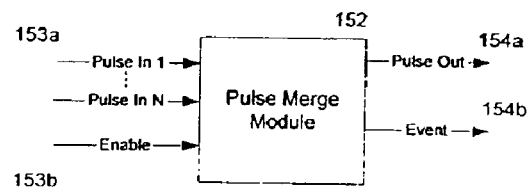
FIG. 2 depicts an exemplary framework module according to FIG. 1.

As shown in FIG. 1, a module 150 contains inputs, outputs and setup registers, or combinations thereof. The setup registers contain configuration settings for the module which alter how the module processes the data. Examples of modules are: an Arithmetic Module, which allows a user to apply defined mathematical and logical functions to the inputs, such as multiplication, addition or square roots; a Display Module which allows for the creation of custom front panel display screens (for use with IED's with standard or optional display devices); an External Boolean Module which allows for a single Boolean register which can be defined as either on or off; a Sag/Swell Module which monitors the voltage inputs for disturbances and, upon detection of a disturbance, breaks the disturbance into discrete components for a more detailed analysis. A complete list of modules is contained in the "ION™ Reference Manual", printed by Power Measurement Ltd., located in Saanichton, B.C., Canada. An exemplary example of a Pulse Merge Module is illustrated in FIG. 2. The module 152 receives pulse inputs from a number of modules N 153a, and responds according to the module function as a pulse output 154a, which is able to be input into another module. The function could be, for example, an AND, OR, or NOT Boolean function. The response can also occur as an Event 154b, which writes the pulse event into a log. There are no register settings required for this exemplary module.

Figure 3:
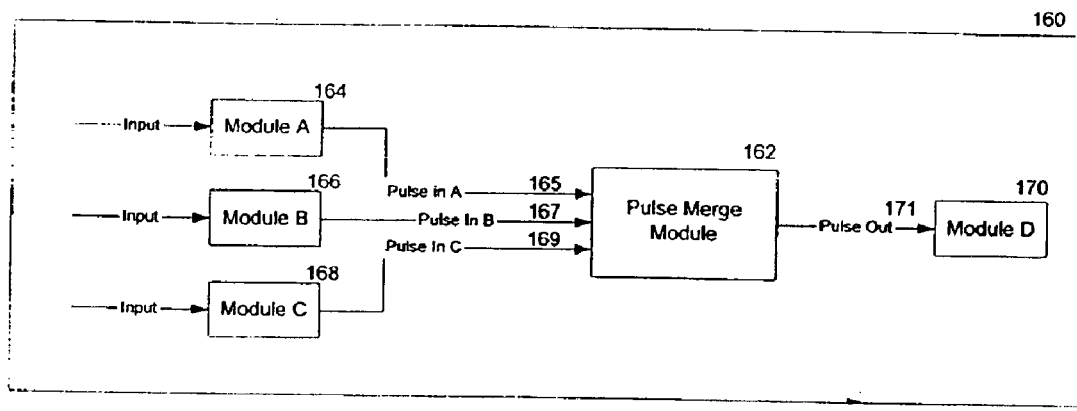
FIG. 3 depicts an exemplary framework incorporating the module of FIG. 1.
Figure 4:
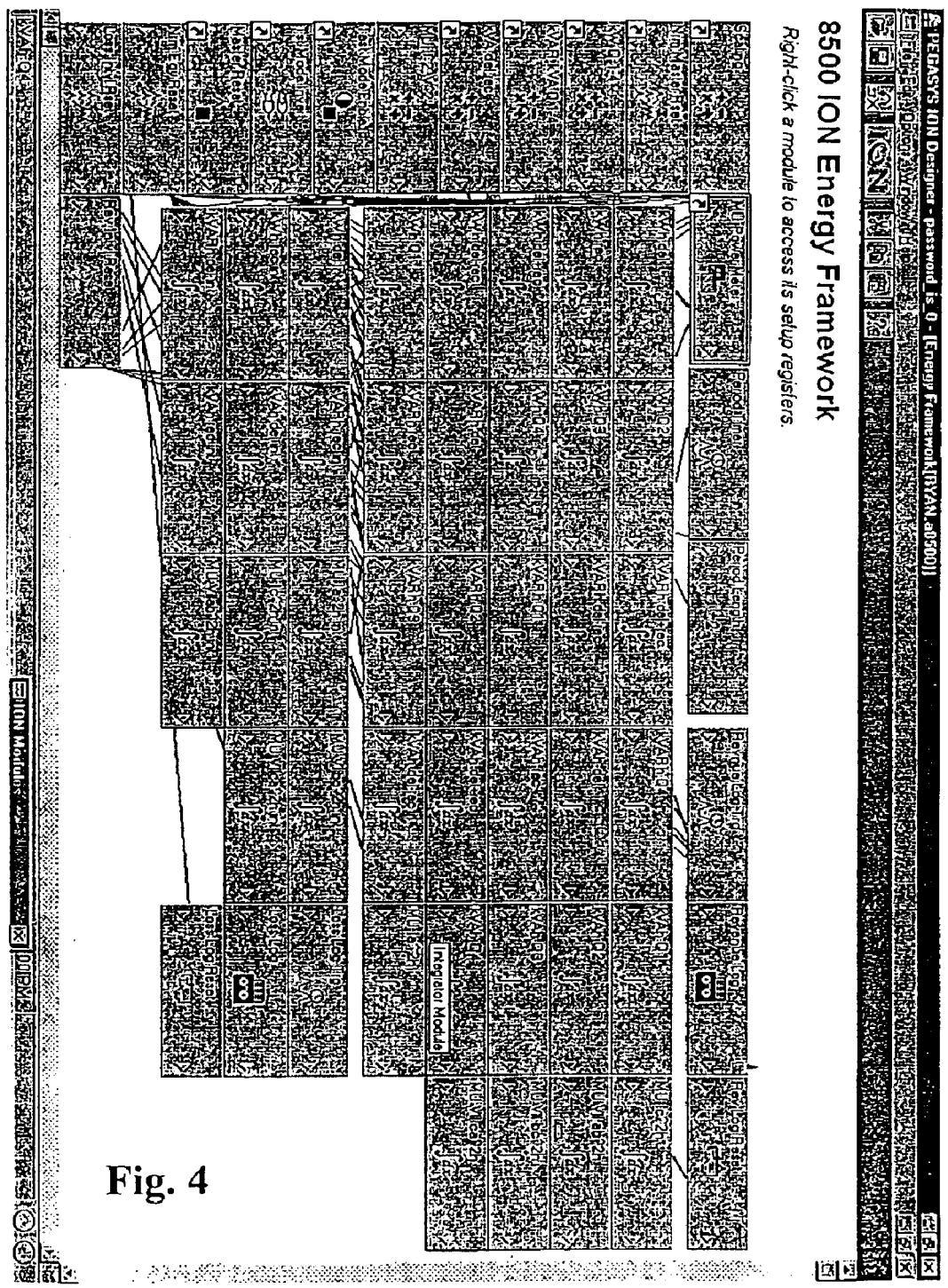
FIGS. 4–6 depict exemplary screen displays from the preferred framework development system along with exemplary frameworks.
Figure 5:
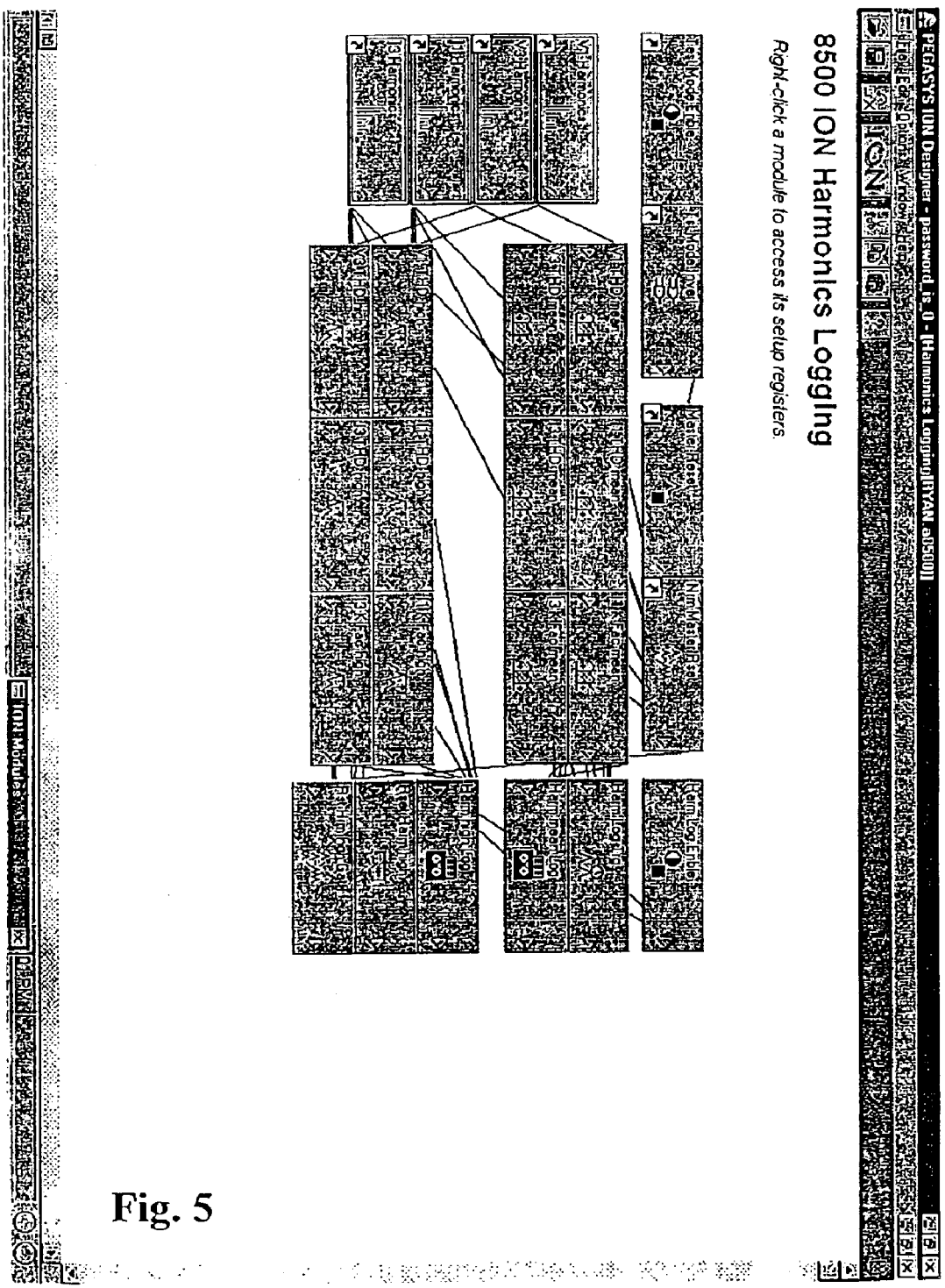
Figure 6:
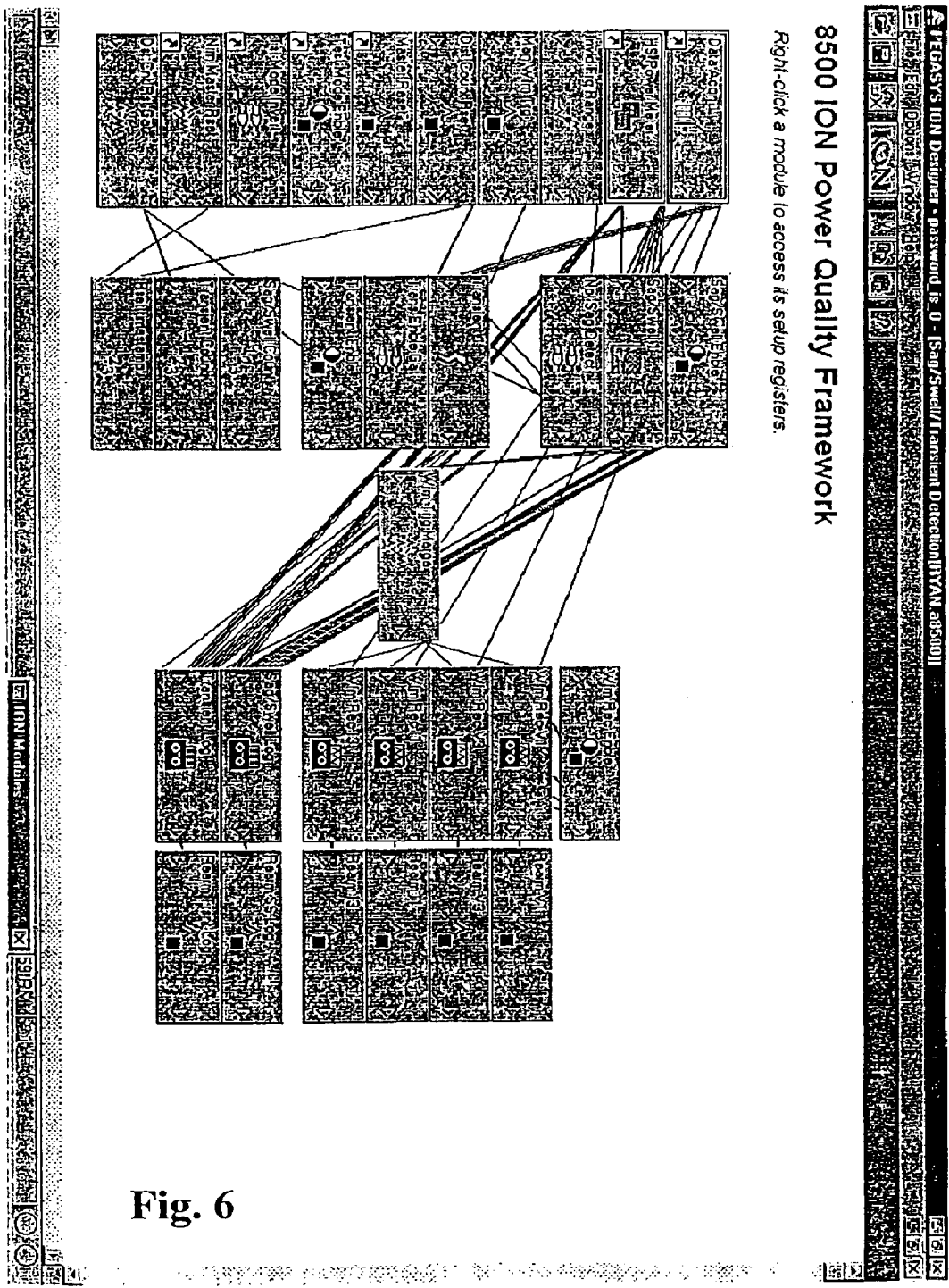

Frameworks are created and manipulated by connecting multiple modules together. Control of the functionality and data manipulation of the IED can be accomplished by one, or several frameworks stored in the IED software applications. They are created in the software package called ION Designer, a component of the Pegasys software manufactured by Power Measurement, located in Saanichton, B.C., Canada. FIG. 3 illustrates a portion of a framework 160 that contains a Pulse Merge Module 162, which receives inputs from Module A 164, Module B 166 and Module C 168 and outputs a pulse into Module D 170. For example, Module A, B and C are Maximum Modules, configured to monitor a source value and send an output pulse 165 167 169 every time the source reaches a new maximum value. The pulse output 171 from the Pulse Merge Module 162 is connected to Module D 170, an Alert Module, which is configured to alert the appropriate party that a maximum value has been reached in the system. FIGS. 4–6 depict exemplary screens from the ION designer software package along with exemplary frameworks.

Frameworks essentially utilize the raw data generated by the IED to produce useful results and/or perform useful functions. Frameworks ultimately create and manipulate the functionality of the device and they can be designed in a way that permits and promotes customization and expansion of devices. This customization/expansion quality of the frameworks is extremely valuable to customers because the cost of customizing or expanding a frameworks™ based device is much less than the cost of replacing or reworking an existing program or solution. IED's may be reprogrammed and reassigned to new applications quickly simply by loading new frameworks into the device. "Core" frameworks refer to those frameworks that are not subject to potential customization by the consumer whereas "custom" frameworks™ refers to those frameworks which may be customized or developed by the end user or third party. Core frameworks are provided by the manufacturer. In one embodiment, the manufacturer may also develop and provide custom frameworks.

As was noted above, IED's are highly customizable and configurable to the specific needs of the end user's power management applications. However, this requires effort on the part of the consumer of such devices to configure and tailor the IED's to their needs. It would be impractical for the manufacturer to offer every conceivable combination of options and software and would likely lead to higher manufacturing costs. Further, the capabilities of the IED's make it impossible to predict how an end user may want to use the functionality of the device. It is therefore desirable to provide a system through which a customer can order an IED pre-configured to their specific needs such that the device is ready to be installed and used within the customer's specific power management application upon receipt from the supplier or manufacturer of the device. Further, such a system should integrate with the manufacturing or supply chain of the IED's so as not to add complexity to the manufacturing or supply process.

Typically, an IED end-user will order generic devices from a manufacturer or distributor and customize those devices to their specific needs on-site. In most cases, the user has their own "meter shop" and personnel who install and maintain the IED's owned by the user. The disclosed embodiments permit the end-user to order IED's from a manufacturer or distributor specifically customized to their needs including all options and software such that when the IED is delivered, it is ready to be installed out of the box.

The disclosed embodiments relate to a build-to-order system for conducting interactive electronic commerce and more particularly to a method for specifying custom hardware and software configurations when ordering IED's so that they are configured to exactly match a customers unique requirement before shipping the device. Further, a medium is provided to allow the sharing of both core and custom framework solutions with other customers as well as the ability to clone and/or modify existing frameworks solutions when ordering a customized device. The disclosed embodiments allow the customer to provide this information in advance over the Internet such that the IED device is ready to perform as desired by the user as soon as it is installed. This is similar to "Plug and Play" for computers and their attached peripheral devices.

On the Internet, the number of sites allowing remote electronic ordering (e-commerce) of products is increasing daily. At a typical e-commerce site a consumer can access online catalogs, containing text and other graphical and multimedia based information about specific items. A consumer can select products, choosing which options they may desire, purchase the products online and even receive instant confirmation of their order upon completion of their transaction. U.S. Pat. No. 5,710,887 discloses such e-commerce shopping where consumers are able to select and add products to their "electronic shopping carts" where U.S. Pat. Nos. 5,909,492 and 5,715,314 further describe the consumers confirmation of their order.

U.S. Pat. Nos. 5,963,743 and 5,991,543 disclose customized testing software for build-to-order systems, specifically computer systems, however they fail to disclose enabling the customer to order an IED device and specify and customize the hardware and software/frameworks configuration.

In one embodiment, a system and method of providing/building and configuring IED's to order is provided. It will be appreciated that while the disclosed embodiments are described in terms of the manufacture of IED's, they are applicable both to the manufacture of IED's as well as to the provision of IED's through other parts of the supply chain, such as from aftermarket, original equipment manufacturers ("OEM") or other secondary providers or suppliers. Any entity which provides IED's to end-users is contemplated. For example, a dealer or OEM of IED's retrieves a stock IED from their inventory and configures it according to this invention prior to shipping it to the customer/end-user.

A customer/end-user, such as a supplier or consumer of electrical energy, places an order with a manufacturer or provider of IED's. In addition to the customer identification and payment information, the order includes three primary parts: a first specification of the type and model of IED the customer wishes to purchase; a second specification of the optional hardware they would like added to the IED; and a third specification of the software to be installed on the IED prior to delivery. The order specifies all of the parameters necessary to provide one or more IED's to the customer that meet the customer's specific needs and require no further configuration to be installed in the customer's application.

The first specification is used to select a particular product from a the product line offered by a manufacturer or dealer. Typically, a manufacturer of IED's will design and manufacture one or more discrete sets of devices directed to different operating goals or customer bases. Each of these discrete sets or types of IED's may have different combinations of capabilities as well as different price points driven by market parameters such as by categories of customers. For example, one type of IED may be targeted to a utility/supplier of electrical energy while a different type of IED may be targeted to a consumer of electrical energy. The two different types may share common capabilities but may also offer unique capabilities desirable to their target market only. Further, as a manufacturer develops their technologies, new IED types or models may be introduced with added, improved or updated features and capabilities. A particular type of IED may further include various models. In this case, all models of an IED within a particular type may share common attributes such as a common form factor or a common base set of capabilities. In addition, each model within a particular type may offer additional optional capabilities or improved features. For example, All type A meters may have the capability to store measured data in a memory. A type A, model 1 meter may be able to store 20 readings while a type A, model 2 meter may be able to store 40 readings. Again, each model within a particular type may be targeted to a specific market category or price point. It will be appreciated that product offerings are manufacturer independent and that types and models may vary and that further, some capabilities or features may be added via optional hardware as described below.

Once a customer has specified which type and model of IED they want, they may also specify optional hardware to be added to the IED. The optional hardware typically includes hardware which adds non-standard features or capabilities which can be added to any model or type or any model within a particular type. It will be appreciated that hardware which is optional on one type or model of device may be standard on another model or type of device. Optional hardware includes, but is not limited to, network interface cards such as Ethernet cards, modems or other communications devices, additional memory storage, remote display devices, current transformers, power supplies, terminal strips or LonWorks™ distributed network functionality control hardware. In some cases, the customer may not wish to add any optional hardware, for example, to keep costs down. In this case, the customer will specify no optional hardware.

Finally, the customer specifies the software which they want loaded on the IED. As was noted above, the software which operates the IED is divided into two types, the firmware and the software applications or frameworks. The firmware is loaded by the manufacturer or secondary provider according to the type and model of the IED as well as the optional hardware installed. Further, standard or core frameworks may also be loaded which provide basic or generic functionality for the device.

In addition, the customer may specify custom frameworks to be loaded on the IED prior to shipment. These custom frameworks may be frameworks developed internally by the customer for tailoring the IED to a specific task. As will be described below, the new IED being ordered may be intended to replace a defective IED in the field. In this case, the customer desires that the new IED to be configured exactly like the existing device so that the two devices can be swapped with no further effort involved in configuring the new device. Another example involves a customer which is expanding operations and needs to order many IED's all configured identically for a new application or to a particular device or set of devices which are currently installed in the existing installation. In this case, the customer may provide their custom frameworks to the manufacturer so that all of the new IED's can be pre-configured as described above. Custom frameworks may also be developed by other customers and shared or traded, or may be developed by third parties or by the manufacturer or secondary provider of the IED and offered as options. Further, the customer may specify a custom combination of optional custom or standard/core frameworks developed and provided by the manufacturer or a combination of optional, standard/core and custom frameworks. By allowing the specification of custom frameworks, standard/core frameworks, and combinations thereof, the customer is enabled to buy configured-to-order devices.

In the preferred embodiments, the ability to specify the IED model/type, optional hardware and custom frameworks in an order for an IED is provided via an automated order processing interface. It will be appreciated that there may be many alternative methods of processing orders, both manual and automated, and all such methods are contemplated. The interface is preferably implemented as an Internet or extranet accessible web site (described in more detail below). Alternatively, the interface may be accessible via a private network such as an intranet, extranet or combination thereof with a publicly accessible network such as a virtual private network utilizing the Internet. The web site may be an open site where anyone can order an IED or may be a secure site requiring customers to register or log in for access. Alternatively, the interface may be implemented as an electronic mail interface which processes orders via electronic mail interactions, either secure or unsecured. Further, the interface may be implemented using telephony based services such as automated telephone or operator assisted interfaces or facsimile based interfaces.

The preferred interface provides the functionality to receive an order for one or more IED's from a customer. The interface preferably also provides the functionality for a customer to modify an existing order that has not shipped out yet. The order includes the specifications of the type and model of IED, the optional hardware and the custom frameworks to be loaded. In one embodiment, the interface also allows customers to order generic or non-custom IED's with optional hardware and core frameworks but without specifying custom frameworks. The combination of the three specifications, IED type and model, the optional hardware and custom frameworks is referred to as a "configuration." As described above and in more detail below, the preferred order processing interface receives the configuration from the customer. In one embodiment, order entry web pages are provided which allow the customer to enter all of the information specifying the configuration of the IED's they wish to buy. For receiving the configuration information, the interface may provide pull-down menus, pick lists or text entry fields as are known. In one embodiment, the order entry web pages implement a e-commerce based catalog and shopping cart data construct as are known. Further, the interface provides the functionality to allow the customer to provide/upload their custom frameworks to the order processing interface. The custom frameworks will be passed to manufacturing (described in more detail below) where they will be loaded on the IED once manufactured.

In an alternative embodiment, the configuration may be selected from a database of stored configurations. This database is coupled with the interface and may be publicly available to any customer or exclusive to a particular customer. When specifing a configuration from the database, the customer may choose to provide/upload their custom frameworks to the order processing interface or the custom frameworks may also be stored in the database (as will be described below). In one embodiment, each customer has a private library of configurations stored within the database and accessible only to that customer. In still another embodiment, a customer can share configurations, including frameworks, with other customers. In addition, public libraries of custom configurations and/or frameworks may be provided for the customer to select from.

In another embodiment, the order processing interface provides a mechanism to receive batch or bulk orders for IED's. In one embodiment, a customer may upload a list of devices and configurations to the interface. The interface then parses the list and processes the order as described for the desired devices. In another embodiment, the interface communicates with a customer's client side product specification/computer design software program such as used by a construction company that designs and constructs buildings. The design software program facilitates the overall design process for the construction project and typically is capable of generating an inventory of parts and supplies needed to construct the building. Included within that inventory is a specification of the power management devices that will be necessary. This specification can be communicated directly to the order processing interface by the design software. The order processing interface then parses the specification into the individual products and configurations and processes the order as described. For example, the automated services such as Simple Object Access Protocol (SOAP) or BizTalk, which use the extensible markup language ("XML") as the data interchange format, may be utilized in conjunction with the order process to allow batch ordering and processing of orders and hence reducing or eliminating the human intervention required during the ordering process. For example a construction company may utilize an automated service to order and track the products required to complete a building, managing delivery dates and other scheduling issues, such as delivery and ordering of building supplies and materials which may include, among other things, IED's. The construction company's automated service places the building requirements into a data file and transfers the data file request to the automated order processing interface of the virtual meter site. The order processing interface, which is configured to determine the custom needs of the requested devices based on the data file, initiates the device order request and returns an order confirmation to the construction companies automated service. The ordered IED's then follow the manufacture process as outlined earlier.

In yet another alternative embodiment, a customer may order a new IED by specifying that the new IED be configured identically to an existing IED owned by the customer. In one embodiment, the database described above stores the configurations for all previous orders placed by a particular customer. When the customer orders a new IED, they have the option of selecting the configuration of a previously ordered IED from this database. The customer may specify the previous order by entering the serial number, network address, such as the device's Internet Protocol ("IP") address, or other tracking identification of the existing device or may select the configuration from a list. In another embodiment, configurations of existing IED's owned by a customer are maintained on a customer owned computer coupled via the network with the order processing system. This allows the customer to upload the configurations of previously ordered IED's to the order processing interface when placing a new order for a new device.

In addition, the preferred embodiments provide the capability to clone existing installed devices. In this embodiment, the customer specifies a serial number, tracking number or other identification such as a network address, e.g. IP address, of a network accessible IED having a configuration they wish to use on the new IED they are ordering. Using the identification, the order processing interface automatically communicates directly with the existing IED in the field via the network. The order processing interface downloads the configuration, including the type and model of IED, the installed optional hardware and custom frameworks to generate the order for the new IED. The communications between the existing IED and the order processing interface is preferably secure but maybe unsecured as well. This functionality enables a customer to easily order new IED's configured exactly like existing IED's without having to remember the configuration information or de-install the device.

In another embodiment, an interface is provided to assist a customer who is unsure of what configuration they need for their application. This interfaces performs an assessment, such as through an interactive hierarchical series of interrogatories presented via a web page, to determine the custom needs of the particular customer. Once the needs are assessed, the interface computes a custom configuration, including the IED type and model, the optional hardware and custom frameworks to accomplish the customer's application. This may be performed using a look up table which correlates answers to various specific questions with pre-defined custom configurations.

At each step of the order process, as the configuration is determined, the interface validates the choices of the customer. In an alternative embodiment, the validation is a batch process which occurs once the customer has finished specifying the desired configuration. A particular choice may be invalid where the specified type or model of IED is no longer manufactured or otherwise available, the chosen optional hardware is incompatible with the specified type or model of IED, or the custom frameworks specified by the customer are outdated or incompatible with the specified hardware. In one embodiment, the order processing interface automatically provides valid substitutions for the invalid choices. In another embodiment, the invalid choices are flagged for the customer and they are permitted to re-select valid choices.

Once the customer has completed their order specified all of the IED's and corresponding configurations that they wish to purchase, they submit the order. Upon order submission, the order may be confirmed back to the customer who then has the opportunity to review the order and make any changes. Once confirmed, the order is processed and sent to manufacturing as described in more detail below. In one embodiment, IED's and corresponding configurations are added to a shopping cart data structure, as is typically done in e-commerce based web sites. When the customer is finished ordering, they can "check out" their shopping cart to complete the order process. Once the order is submitted and confirmed, it is also stored in a database, as described above, for future reference in future orders.

The interface further provides order management capabilities which allow a customer to review past orders and check the status of current orders, such as the real time shipping status. Further, functionality is provided for a customer to manage and maintain their own private configuration library. For orders which have not yet shipped, the customer is also provided with tools which allow modification to the order, such as adding or deleting IED's from the order or modifying configurations. As will be discussed in more detail below, where a change is made to the configuration of an IED after the manufacturing of that IED has begun or after the affected manufacturing step has completed, the order processing system generates a re-work order which will cause the completed IED to be re-sent through the manufacturing process to implement the change. In one embodiment, the order processing interface provides secure private custom web based portals for customers to manage and maintain their own IED and configuration datasets as well as interact with the order management capabilities.

The order processing interface described above is integrated with the manufacturing/supply process of the IED provider so as to automate the fulfillment of the orders. The order processing interface continually watches, based on events such as order or update submission/confirmation, for new order or updates to existing, but not yet complete, orders and feeds this information to the manufacturing processing system. Receipt of a new order or a re-work order from the order processing system triggers the manufacturing processing system. The manufacturing processing system then implements the manufacturing/supply process. The order may first be validated by an order validator (or re-validated if the order processing system has already validated it) to ensure that the configuration is manufacturable. If an invalid configuration is determined, the order can be flagged and returned to the order processing system which can then contact the customer to correct the problem. Alternatively, a suitable substitution for the invalid configuration may be automatically provided. For example, where an older model of a particular IED is requested but no longer available, the newer model may be automatically substituted. Once the order is determined to be valid, an IED of the specified type and model is constructed (or retrieved from inventory in the case of a secondary supplier). Once constructed, the specified optional hardware is installed. Finally the core and custom frameworks are loaded into the device. Further manufacturing steps may be performed. For example, refer to U.S. patent application Ser. No. 09/792, 699, entitled "SYSTEMS FOR IMPROVED MONITORING ACCURACY OF INTELLIGENT ELECTRONIC DEVICES," captioned above. In one embodiment, the necessary configuration information is retrieved by manufacturing from the database described above at each manufacturing stage. For re-work orders, the IED to be altered is recycled through the manufacturing process to the appropriate stage where the modification is to be made.

Once complete, the IED is ready for shipment to the end-user. The IED includes all of the requested hardware and software and is ready to be installed and utilized within the customer's specific application upon delivery.

Figure 7:
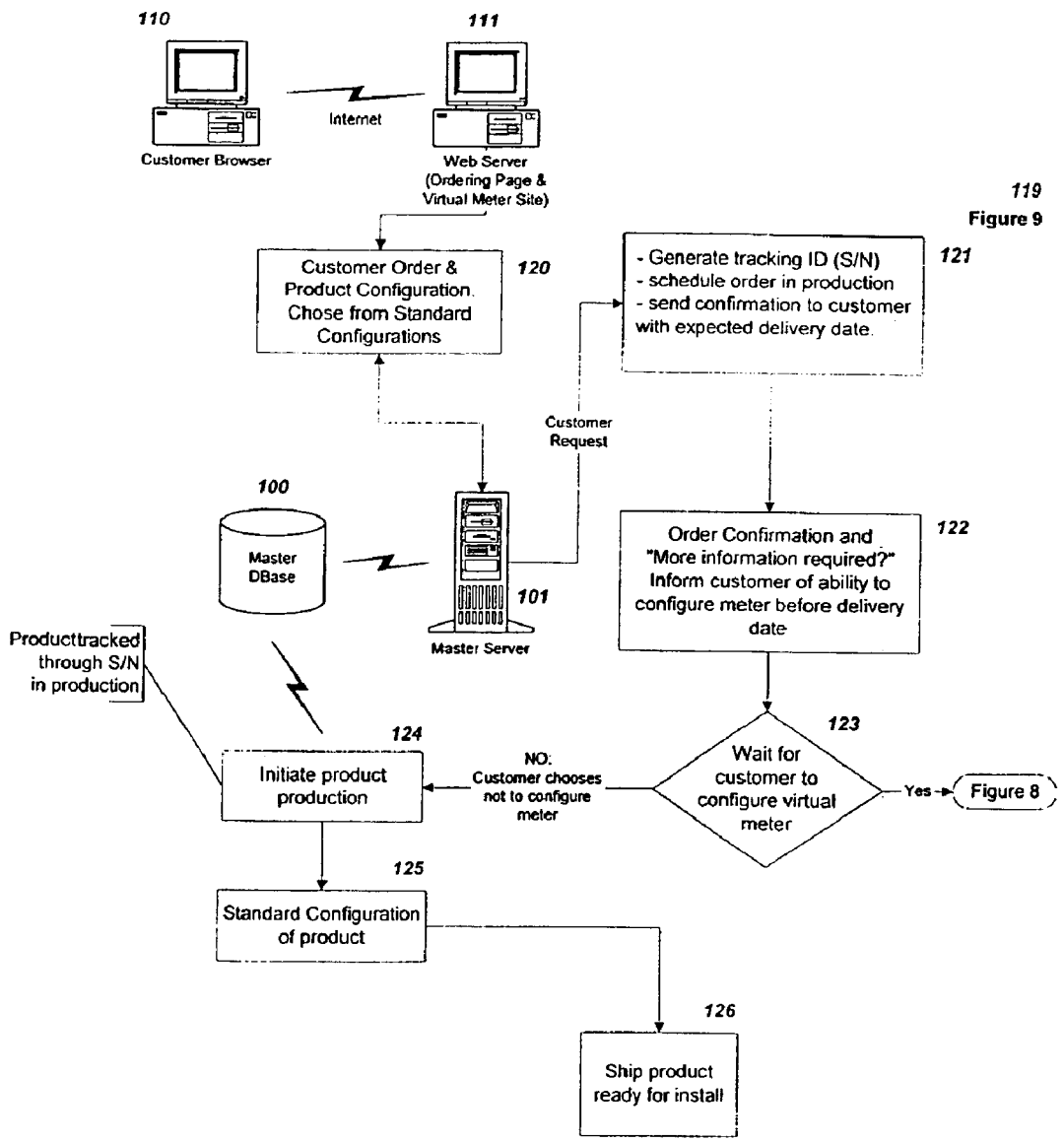
FIG. 7 illustrates an overview of the preferred embodiment of customer and ordering interaction with the preferred order processing interface.

Referring back to the figures, and in particular FIG. 7, there is shown an overview of the preferred embodiment of customer and ordering interaction with the order processing interface 119, also referred to as the Virtual Meter Web Site 119, for ordering standard/generic device configurations. The order processing interface web site is served by a web server computer 111. The customer first enters the Virtual Meter Site via a home page or custom portal web page using an Internet World Wide Web browser program 110 operating on their local computer, which is connected over a network, such as the Internet to the web server 111. An exemplary browser is Internet Explorer™, manufactured by Microsoft Corporation, located in Redmond, Wash. It will be appreciated that this may be a secure connection using secure sockets layer ("SSL"), encryption such as PGP, firewalls, proxy servers or other network security mechanisms as are known.

Within the Virtual Meter Web Site 119, the customer has the ability to select products and desired configurations, as well as change and upload custom configurations/frameworks 120. The site 119 is coupled with a master server 101 which further includes the order management database 100. The server 101 and database 100 maintain all of the data related to current and previous orders as well as store configurations libraries as discussed above. The Master Server 101 is further coupled with the Production Department (not shown) and is capable of scheduling requested orders into production. When an order is generated and scheduled, the server 101 generates a Tracking ID or Serial Number (S/N) 121 which can be used to track the order as it progresses through the manufacturing process. The Master Server 101 also has the ability to communicate with the customer via email or other form of communications informing them of expected delivery date and actual delivery date once the requested product has been built & is ready to ship. Furthermore, the Master Server 101 has the ability to contact the customer via email or other automated system (such as a fax) requesting more information, if they have not completed the product order form correctly, or informing them of the ability to continue to customize their order before the product's production commences 122, 123.

Once the requested device is ready to be built in the Production Department or retrieved from inventory, the Master Database 100 is checked to confirm if a custom configuration has been requested. Production of the device is then initiated 124, the device being tracked with the S/N. If no custom configuration request is found, a standard configuration of the device 125 is performed and the product is shipped 126. If a custom configuration has been requested custom configuration is done, as outlined in the FIG. 9 and described below.

Figure 8:
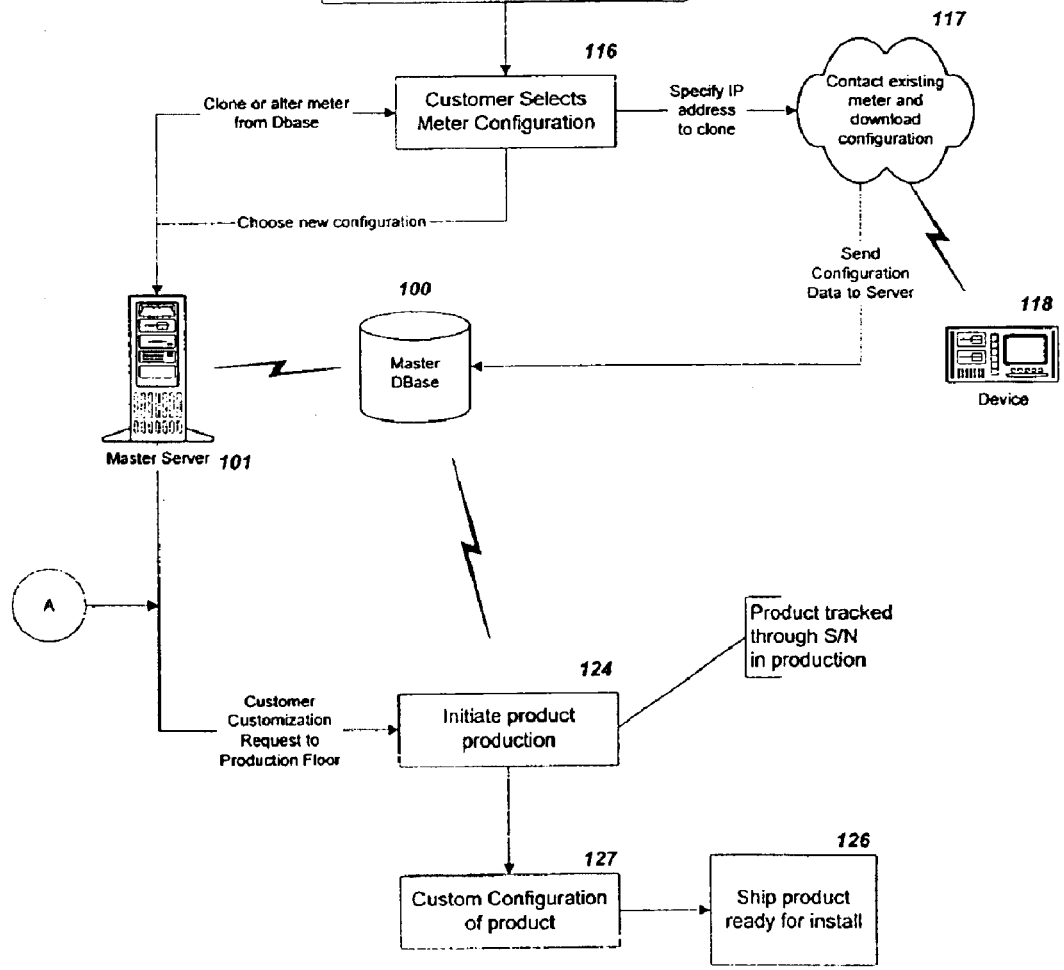
FIG. 8 illustrates a more detailed overview of the preferred embodiment of customer and ordering interaction for specifying custom IED configurations.

FIG. 8 illustrates a more detailed overview of the preferred embodiment of customer and ordering interaction with the preferred order processing interface for orders of IED's with custom configurations. As outlined in FIG. 8 the customer first enters the Ordering Page or entrance to the Virtual Meter Site 111 through their browser 110, which is connected over a network (or the Internet). In one embodiment, the Virtual Meter Site 119 allows the customer to login to a custom screen which gives more detailed information such as the customer's historical order information, custom and generic/core stored frameworks 115, as described above. This secure login provides only this customer access to any stored private information. As above, the customer selects the device configuration 116, which can be either a new device, cloned from an existing device 118 or copied from the customer's historical orders which is accessible through the Master Server 101. As was described above, the order is validated to ensure that the requested configuration is manufacturable/producible. In particular, for cloned configurations, the cloned device may no longer be manufactured or the hardware options or custom frameworks may be incompatible or outdated due to technology changes. As was discussed, the order processing interface 119 may include an order validator designed to flag invalid configurations whether manually specified by the customer or derived through cloning of an existing device. Once an invalid configuration is detected, the interface 119 may present the invalid order back to the customer for modifications, coupled with suggested suitable alternatives to the invalid aspect or may automatically provide a suitable substitution to meet the customer's overall requirements.

Once the requested device is ready to be build the Master Database 100 is checked to confirm configuration and product production is initiated 124. As the product is tracked through production with a tracking ID or S/N a request to the Master Server 101 allows the Custom Configuration of the product 127 before final shipping 126.

Figure 9:
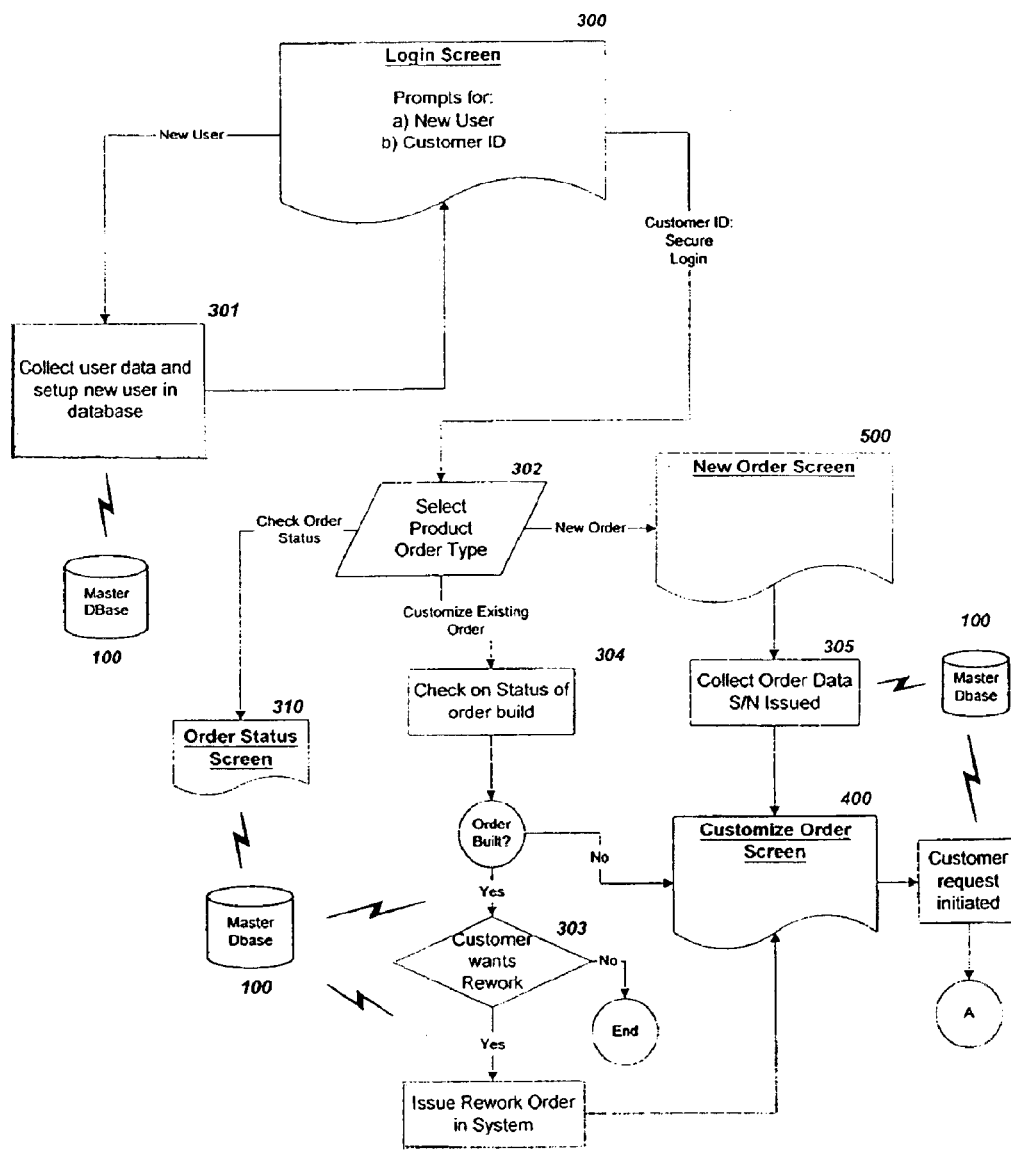
FIG. 9 illustrates a preferred order processing interface according to the preferred embodiments.

FIG. 9 illustrates a preferred embodiment of customer login to the Virtual Meter Site (VMS) 119. The Login Screen 300 allows the customer to login and retrieve their Company information. It also allows for collection of new customer data 301 and storage of this new user information in the Master Database 100. Once the customer has logged in they are given the ability to Select Product Order Type 302 which allows the customer to check the status of a pending order 310, modify a pending order 304 or create a new order 500. The customer can check the status of a new pending order through the Order Status Screen 310 which is coupled with the Master Database 100 and retrieves the order information relating to the current status of pending orders. Customers can also customize an existing order 302 which checks to see if the order has been built, but not yet shipped. If the order has not shipped, the customer may enter the Customize Order Screen 400 to modify the order, as described above. If the order has been built the customer is notified they must issue a Rework Order 303 before proceeding to the Customize Order Screen 400 and that this may delay shipment. If the order has not yet been built, the customer may modify the order.

The order type 302 may also be a new order which leads the customer to the New Order Screen 500. Once the new order data is collected a Tracking Number or S/N is issued 305 and associated with the order in the master database 100 and the customer continues on to the Customize Order Screen 400.

Figure 10:
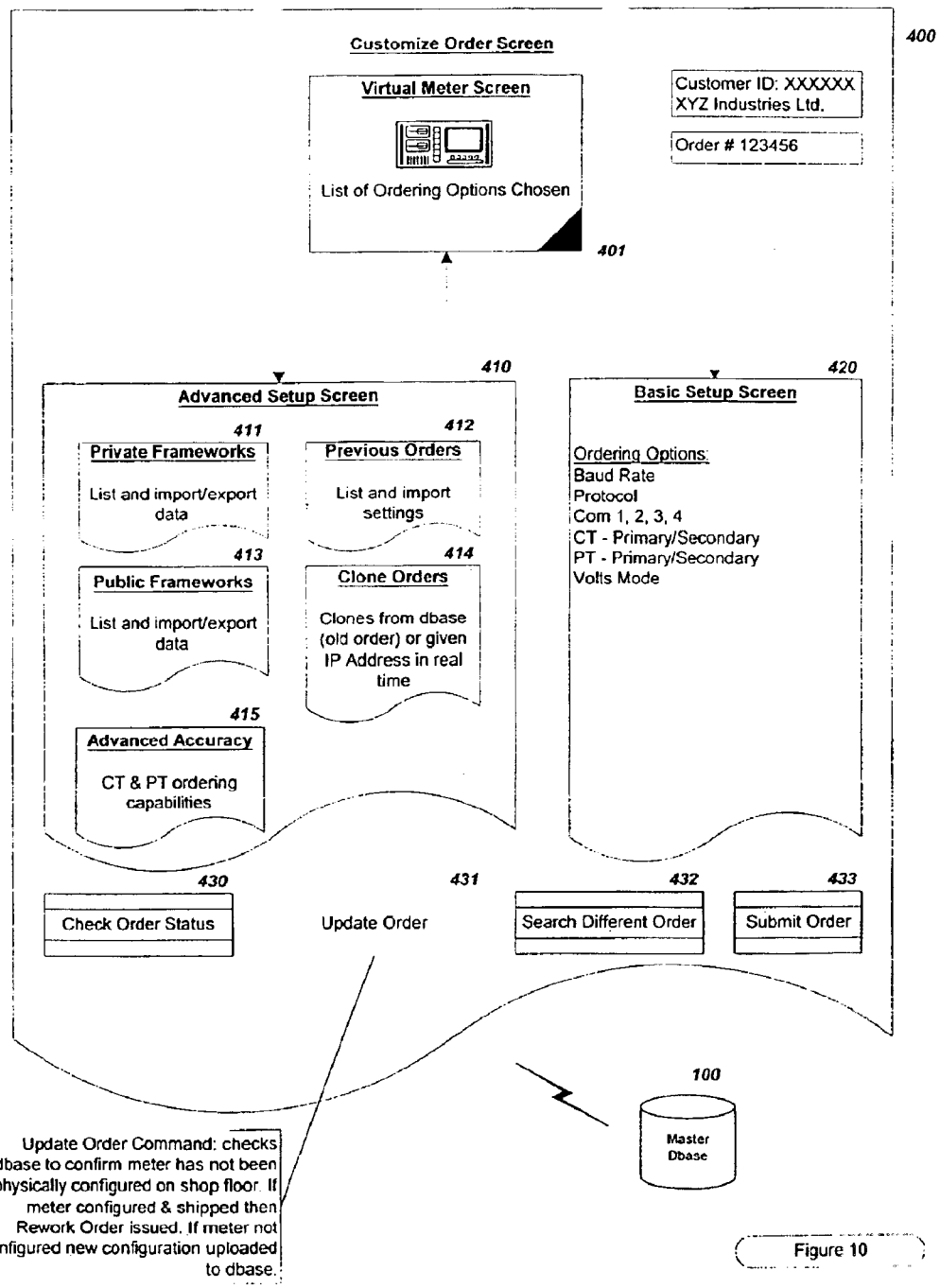
FIG. 10 illustrates the interface for specifying custom IED configurations.

FIG. 10 illustrates a preferred embodiment of the Customize Order Screen 400. This Screen consists of an Advanced Setup Screen 410 and a Basic Setup Screen 420. The Virtual Meter screen 401 lists the current configuration of the IED to be ordered.

The Advanced Setup Screen 410 allows the customer to choose several options for customizing the configuration. The customer may choose to configure using a previous order 412 which recalls and lists previous order configurations stored in the Master Database 100. Alternatively or in addition, the customer may choose to select one or more public frameworks 413 from a library of publicly available custom frameworks. Examples include: General Set, Power Quality (includes Power Frequency, Voltage Magnitude, Flicker, Voltage Dips, Interruptions, Overvoltages, Voltage Unbalance, Harmonic and Interharmonic Voltages) Lonworks™, Datalogging, Modbus Slave and DNP Slave. Both core and custom frameworks can be also uploaded to this library to share with other users, as described above.

Custom framework examples include Current/Voltage monitoring, Capacitor Bank Controllers and Transformer Loss Calculations. Alternatively or in addition, the customer may choose to select one or more private frameworks 411 which may be either stored in the Master Database 100 or uploaded by the customer. Private frameworks are visible only to the customer upon secure login and can contain both core and custom frameworks.

Further, the customer may choose to clone a previous order 414 stored on the Master Database 100 or clone an existing installed device using an address/identifier provided by the customer. Types of communication, such as direct dial-up, wireless (cellular, Bluetooth, or other wireless technologies), Ethernet, IP or email connections may be used to poll data from a device using protocols such as telephony, SMTP, HTTP, TCP/IP, FTP, XML, etc.

The Advanced accuracy 415 option allows customers to specify ordering options complete with current transformer ("CT") and voltage transformer ("PT") calibrated systems. For more information, refer to the related references captioned above.

The Basic Setup Screen 420 allows customers to choose from hardware options such as: Password Security, Polarity of PT and CT, Unit ID, Baud Rate, Protocol, Com 1,2,3,&4, CT Primary/Secondary, PT Primary/Secondary or Volts Mode.

A customer may also Check Order Status 430, allowing the retrieval of delivery date and other order data in real time, and Search Different Orders 432, allowing them to retrieve old data for previous order which have been shipped. Furthermore a customer may also use the Update Order 431 function if they are re-configuring an ordered device before it has been shipped, as was described above.

Finally the customer Submits Order 433 which permanently updates the Master Database 100 with the information tagged to a Tracking ID or S/N.

FIG. 11 illustrates a preferred embodiment of New Order Screen 500. A Customer may duplicate a Previous Order 510 or select from the Product List 511 when adding or editing their Current Orders 512. Pricing may also be dynamically updated with the use of the Update Order Pricing 520 feature as new Ordering Options are chosen from the Product List 511. Once the Submit Order 521 has been requested the collected data is passed to the Master Database 100 and a Tracking ID or S/N is generated (not shown).

Once delivered to the end-user, similar functionality as described above may be used to re-configure or upgrade IED's once installed. For more detailed information refer to U.S. patent application Ser. No. 09/792,699, entitled "SYSTEMS FOR IN THE FIELD CONFIGURATION OF INTELLIGENT ELECTRONIC DEVICES," captioned above.

Once the order has been submitted, it is passed to manufacturing where the specified IED is produced and delivered to the customer. In this way, the disclosed embodiments permit the custom ordering of IED's which are built to the specifications of the customer. The embodiments further permit the custom configuration of the IED's prior to delivery such that they may be used without further effort of the end-user. While build to order systems are generally known, these systems typically produce a custom assembly of standard parts and/or software but have no facility for integrating custom parts and/or software with the standard offerings. Essentially then only providing discrete, although numerous, products comprising combinations of standard parts. The product still requires configuration by the user once received. For example, a computer manufacturer may offer build to order computers where the customer may specify the amount of memory, the hard drive size and the inclusion of a modem. The customer may further specify that they wish to have certain software installed such as a particular operating system or applications suite. However, upon receipt of the ordered computer system, the customer will still have to configure the system to their liking such as by setting screen saver, password or other preference information. While the computer system is built to the customer's specification, it is not fully configured and ready to use in the customer's specific applications upon receipt. The disclosed embodiments describe a build and configure to order system which alleviates the need of the customer to spend time configuring the hardware once they receive it.

It is therefore intended that the foregoing detailed description be regarded as illustrative rather than limiting, and that it be understood that it is the following claims, including all equivalents, that are intended to define the spirit and scope of this invention.

We claim:

1. A method of processing an order from a customer by a provider for an intelligent electronic device ("IED"), said IED capable of being utilized to manage an electrical power distribution system, said IED being characterized by at least one model and at least one type, said IED comprising storage operative to store software, said method comprising:

(a) receiving by an order processing system, a first specification identifying a first IED to be ordered, said first specification identifying a particular of said at least one model and type;
   (b) receiving by said order processing system, a second specification identifying optional hardware to be installed in said first IED;
   (c) receiving by said order processing system, a third specification identifying software to be installed in said first IED including at least a portion thereof to be provided by said customer;
   (d) receiving by said order processing system, said portion of said software provided by said customer;
   (e) providing said first IED of said specified particular model and type;
   (f) installing said specified optional hardware into said first IED;
   (g) configuring said storage of said IED based on said software, including at least said portion thereof received from said customer; and
   (h) supplying said first IED to said customer wherein said first IED is capable of being utilized by said customer without further configuration according to said first, second and third specifications.

2. The method of claim 1, wherein said first IED comprises an electrical energy meter.

3. The method of claim 1, wherein said order processing system is coupled with a network, (a) further comprising receiving said first specification over said network, (b) further comprising receiving said second specification over said network, and (c) further comprising receiving said third specification over said network.

4. The method of claim 3, wherein said network comprises the Internet.

5. The method of claim 3, wherein (a) further comprises receiving said first specification from a client side product specification software program coupled with said network, (b) further comprising receiving said second specification from said client side product specification software program, and (c) further comprising receiving said third specification from said client side product specification software program.

6. The method of claim 3, wherein at least one of (a), (b), and (c) are performed by an interface coupled with said order processing system.

7. The method of claim 6, wherein said interface comprises an Internet accessible web site.

8. The method of claim 6, wherein said interface comprises an email server.

9. The method of claim 6, wherein said interface comprises an extensible markup language ("XML") server, said first, second and third specifications being received in an XML format.

10. The method of claim 1, wherein said second specification comprises no optional hardware.

11. The method of claim 1, wherein said software is uploaded by said customer to said order processing system.

12. The method of claim 1, wherein (d) further comprises:
   retrieving, by said order processing system, said software from a database coupled with said order processing system.

13. The method of claim 12, wherein said software comprises software proprietary to said customer.

14. The method of claim 12, wherein said software comprises software available to all customers of said provider.

15. The method of claim 1, wherein said first specification further comprises:
   identification of a second IED owned by said customer and accessible via a network and characterized by being of said particular of said at least one model and type; and
   wherein (a) further comprises:
   retrieving identifiers of a model and type of said second IED from said second IED by said order processing system via said network, said first specification comprising said identifiers.

16. The method of claim 15, wherein said network comprises the Internet.

17. The method of claim 15, wherein said network comprises a telephone network.

18. The method of claim 1, wherein said second specification further comprises:
   identification of a second IED owned by said customer and accessible via a network and characterized by having said optional hardware installed; and
   wherein (b) further comprises:
   retrieving identifiers of said optional hardware installed in said second IED from said second IED by said order processing system via said network, said second specification comprising said identifiers.

19. The method of claim 18, wherein said network comprises the Internet.

20. The method of claim 18, wherein said network comprises a telephone network.

21. The method of claim 1, wherein said third specification further comprises:
   identification of a second IED owned by said customer and accessible via a network and characterized by having said software installed; and
   wherein (c) further comprises:
   retrieving a copy of said software installed in said second IED from said second IED by said order processing system via said network, said third specification comprising said copy.

22. The method of claim 21, wherein said network comprises the Internet.

23. The method of claim 21, wherein said network comprises a telephone network.

24. The method of claim 1, further comprising:
(i) storing said order in a database coupled with said order processing system, said database operative to store said first, second, and third specifications and said software for all of said orders placed by said customer.

25. The method of claim 24, further comprising:
(j) receiving, by said order processing system, an identification of a prior order for a second IED previously ordered from said provider, said prior order being stored in said database; and
(k) retrieving said prior order from said database; and
wherein (a) further comprises receiving said first specification from said prior order.

26. The method of claim 24, further comprising:
(j) receiving, by said order processing system, an identification of a prior order for a second IED previously ordered from said provider, said prior order being stored in said database; and
(k) retrieving said prior order from said database; and
wherein (b) further comprises receiving said second specification from said prior order.

27. The method of claim 24, further comprising:
(j) receiving, by said order processing system, an identification of a prior order for a second IED previously ordered from said provider, said prior order being stored in said database; and
(k) retrieving said prior order from said database; and
wherein said prior order comprises said software, (c) further comprising receiving said third specification from said prior order.

28. The method of claim 24, further comprising:
(j) providing access to said database to said customer to at least one of view and modify said stored orders.

29. The method of claim 1, further comprising:
(i) assessing at least one need of said customer;
(j) recommending a particular of said at least one model and said at least one type based on (i); and
wherein said first specification is based on (j).

30. The method of claim 1, further comprising:
(i) assessing at least one need of said customer;
(j) recommending said optional hardware based on (i); and
wherein said second specification is based on (j).

31. The method of claim 30 wherein said optional hardware comprises a current transformer.

32. The method of claim 1, further comprising:
(j) assessing at least one need of said customer;
(j) recommending said soft ware based on (i); and
wherein said third specification is based on (j).

33. The method of claim 1, wherein (e) comprises manufacturing said first IED.

34. The method of claim 1, wherein (e) comprises retrieving said first IED from inventory stock.

35. The method of claim 1, further comprising:
(i) generating a rework order if (b) occurs after (f).

36. The method of claim 1, further comprising:
(i) generating a rework order if (c) occurs after (g).

37. The method of claim 1, further comprising:
(i) receiving an order processing status inquiry from said customer; and
(j) providing order processing status to said customer in response to said inquiry.

38. The method of claim 1, further comprising:
(i) validating said first specification.

39. The method of claim 38, further comprising:
(j) substituting an alternative specification for said first specification where said first specification is invalid.

40. The method of claim 38, further comprising:
(j) suggesting an alternative specification as a substitution for said first specification where said first specification is invalid.

41. The method of claim 1, further comprising:
(i) validating said second specification.

42. The method of claim 41, further comprising:
(j) substituting an alternative specification for said second specification where said second specification is invalid.

43. The method of claim 41, further comprising:
(j) suggesting an alternative specification as a substitution for said second specification where said second specification is invalid.

44. The method of claim 1, further comprising:
(i) validating said third specification.

45. The method of claim 44, further comprising:
(j) substituting an alternative specification for said third specification where said third specification is invalid.

46. The method of claim 44, further comprising:
(j) suggesting an alternative specification as a substitution for said third specification where said third specification is invalid.

47. The method of claim 1 wherein said second specification comprises a volts mode.

48. The method of claim 1 wherein said second specification comprises a CT/PT calibrated system.

49. The method of claim 1 wherein said third specification comprises a power quality framework.

50. The method of claim 1 wherein said third specification comprises a current/voltage monitoring framework.

51. A system for processing an order from a customer by a provider for an intelligent electronic device ("IED"), said IED capable of being utilized to manage an electrical power distribution network, said IED being characterized by at least one model and at least one type, said IED including storage operative to store software, said system comprising:
a server computer;
a first interface coupled with said server and operative to receive a first specification identifying a first IED to be ordered, said first specification identifying a particular of said at least one model and type;
a second interface coupled with said server and operative to receive a second specification identifying optional hardware to be installed in said first IED;
a third interface coupled with said server and operative to receive a third specification identifying software, including at least a first portion thereof to be provided by said customer, to be installed in said first IED, said third interface being further operative to receive said first portion from said customer; and
an order generator coupled with said server and operative to generate said order for said first IED from said first, second and third specifications, said order generator being further operative to generate said order including said software and transmit said order to said provider such that said provider may configure said storage of said first IED based on said software and provide said first IED to said customer, said first IED being capable of being utilized by said customer without further configuration according to said first, second and third specifications.

52. The system of claim 51, wherein said first IED comprises an electrical energy meter.

53. The system of claim 51, wherein said server computer further comprises a network interface coupled with a network, said first, second and third interfaces being further operative to receive said first, second and third specifications over said network.

54. The system of claim 53, wherein said network comprises the Internet.

55. The system of claim 53, wherein said first, second and third interfaces are further operative to receive said first, second and third specifications from a client side product specification software program coupled with said network.

56. The system of claim 53, wherein said server computer further comprises a world wide web server, said world wide web server comprising said first, second and third interfaces, said first, second and third interfaces comprising at least one world wide web page served by said world wide web server.

57. The system of claim 53, wherein said server computer further comprises an email server, said email server comprising said first, second and third interfaces.

58. The system of claim 53, wherein said server computer further comprises an extensible markup language ("XML") server, said first, second and third specifications being received in an XML format.

59. The system of claim 51, wherein said second specification comprises no optional hardware.

60. The system of claim 51, wherein said third interface is further operative to receive said portion uploaded by said customer to said server computer.

61. The system of claim 51, further comprising a database coupled with said server computer and operative to store said software, including said first portion, said third interface further operative to retrieve said software from said database.

62. The system of claim 61, wherein said first portion is proprietary to said customer.

63. The system of claim 61, wherein said software comprises at least a second portion available to all customers of said provider.

64. The system of claim 51, further comprising an IED interface operative to communicate with at least one IED owned by said customer and accessible via a network, said first specification further identifying a second IED of said at least one IED owned by said customer, said IED interface being further operative to retrieve identifiers of a model and type of said second IED from said second IED over said network, said first specification comprising said identifiers.

65. The system of claim 51, further comprising an IED interface operative to communicate with at least one IED owned by said customer and accessible via a network, said second specification further identifying a second IED of said at least one IED owned by said customer, said IED interface being further operative to retrieve identifiers of said optional hardware installed in said second IED from said second IED over said network, said second specification comprising said identifiers.

66. The system of claim 51, further comprising an IED interface operative to communicate with at least one IED owned by said customer and accessible via a network, said third specification further identifying a second IED of said at least one IED owned by said customer, said IED interface being further operative to retrieve a copy of said software installed in said second IED from said second IED over said network, said third specification comprising said copy.

67. The system of claim 51, further comprising a database coupled with said server computer and operative to store said first, second and third specifications for all of said orders placed by said customer.

68. The system of claim 67, further comprising:
a fourth interface coupled with said server computer and operative to receive a fourth specification identifying a prior order for a second IED previously ordered from said provider, said prior order being stored in said database, said fourth interface being further operative to retrieve said prior order from said database and generate said first, second and third specifications from said prior order.

69. The system of claim 67, comprising a fifth interface coupled with said server computer and operative to provide access to said database to said customer to at least one of view and modify said stored orders.

70. The system of claim 51, further comprising a fourth interface coupled with said server computer and operative to assess at least one need of said customer and recommend a particular of said at least one model and said at least one type based on said assessment, said first specification comprising said recommendation.

71. The system of claim 51, further comprising a fourth interface coupled with said server computer and operative to assess at least one need of said customer and recommend said optional hardware based on said assessment, said second specification comprising said recommendation.

72. The system of claim 51, further comprising a fourth interface coupled with said server computer and operative to assess at least one need of said customer and recommend said software based on said assessment, said third specification comprising said recommendation.

73. The system of claim 51, wherein said provider manufactures and configures said first IED according to said first, second and third specifications.

74. The system of claim 51, wherein said provider retrieves said first IED from inventory stock according to said first specification and configures said first IED according to said second and third specifications.

75. The system of claim 51, further comprising a fourth interface coupled with said server computer and operative to receive changes to said first, second and third specifications, said fourth interface being further operative to generate a rework order to implement said changes where one of said first, second and third specifications have been already been implemented before said changes were received.

76. The system of claim 51, further comprising a fourth interface coupled with said server computer and operative to receive an order processing status inquiry from said customer and provide order processing status to said customer in response to said inquiry.

77. The system of claim 51, further comprising an order validator coupled with said server computer and operative to validate said first, second and third specifications.

78. The system of claim 77, said order validator being further operative to substitute an alternative specification for an invalid of said first, second and third specifications.

79. The system of claim 77, said order validator being further operative to suggest an alternative specification as a substitution for an invalid of said first, second and third specifications.

80. An order processor for providing Intelligent Electronic Devices ("IED") from a provider to a customer, said IED capable of being used to manage an electrical power distribution system, said IED comprising storage operative to store software, said order processor comprising:

an order receiver operative to receive an order for a first IED, said order comprising first, second and third specifications, said first specification identifying a model and a type of said first IED, said second specification identifying optional hardware to install in said first IED, said third specification identifying software, including at least a portion thereof provided by said customer, to install in said first IED; and a software receiver operative to receive said portion from said customer; and a provider interface coupled with said order receiver and said software receiver and operative to transmit said order and said software to said provider and cause said provider to configure said storage of said first IED based on said software and provide said first IED to said customer according to said first, second and third specifications such that said first IED is capable of being utilized by said customer without further configuration.

81. The order processor of claim 80, wherein said provider is a manufacturer of said IED's.

82. The order processor of claim 80, wherein said provider is a distributor of pre-manufactured of said IED's.

83. The order processor of claim 80, wherein said order receiver is further operative to receive said order via a network coupled with said order receiver.

84. A method of processing an order from a customer by a provider for an intelligent electronic device ("IED"), said IED capable of being utilized to manage an electrical distribution system, said IED being characterized by at least one model and at least one type, said IED comprising storage operative to store software, said method comprising:

(a) receiving by a network based interface of an order processing system loaded on a server computer, data representing a first specification identifying a first IED to be ordered, said first specification identifying a particular of said at least one model and type;

(b) receiving by said network based interface, data representing a second specification identifying optional hardware to be installed in said first IED;

(c) receiving by said network based interface, data representing a third specification identifying software, at least a portion thereof to be provided by said customer, to be installed in said first IED;

(d) receiving by said network based interface, said portion of said software from said customer;

(e) providing in a manufacturing environment, said first IED of said specified particular model and type;

(f) installing said specified optional hardware into said first IED;

(g) configuring said storage of said first IED based on said software; and (h) supplying said first IED to said customer from said manufacturing environment wherein said first IED is capable of being utilized by said customer without further configuration according to said first, second and third specifications.

85. A system for processing an order from a customer by a provider for an intelligent electronic device ("IED"), said IED capable of being utilized to manage an electrical power distribution system, said IED being characterized by at least one model and at least one type, said IED comprising storage operative to store software, said system comprising:

a server computer including a processor and a memory;

a first interface program stored in said memory and operative to be executed by said processor to receive data representing a first specification identifying a first IED to be ordered, said first specification identifying a particular of said at least one model and type;

a second interface program stored in said memory and operative to be executed by said processor to receive data representing a second specification identifying optional hardware to be installed in said first IED;

a third interface program stored in said memory and operative to be executed by said processor to receive data representing a third specification identifying software, at least a portion thereof to be provided by said customers to be installed in said first IED;

a fourth interface program stored in said memory and operative to be executed by said processor to receive said portion provided by said customer and store said portion in said memory; and an order generator program stored in said memory and operative to be executed by said processor to generate said order for said first IED from said first, second and third specifications, said order generator program being further operative to generate said order including said software and transmit said order to said provider such that said provider may configure said storage of said first IED based on said software and provide said first IED to said customer, said first IED being capable of being utilized by said customer without further configuration according to said first, second and third specifications.

86. An order processor for providing Intelligent Electronic Devices ("IED") from a provider to a customer, said IED capable of being utilized to manage an electrical power distribution system, said order processor comprising:

a server computer comprising an order receiver, a software receiver and a provider interface;

said order receiver operative to receive an order for a first IED, said order comprising first, second and third specifications, said first specification identifying a model and a type of said first IED, said second specification identifying optional hardware to install in said first IED, said third specification identifying software, at least a portion of which is to be provided by said customer, to install in said first IED;

a software receiver operative to receive said portion provided by said customer; and said provider interface coupled with said order receiver and operative to transmit said order to said provider and cause said provider to configure said first IED based on said software and provide said first IED to said customer according to said first, second and third specifications such that said first IED is capable of being utilized by said customer without further configuration.

* * * * *